TAPE HANDLING APPARATUS

Filed July 1, 1963 5 Sheets-Sheet 1

INVENTOR
SEYMOUR KLEIN
BY Martin Lukacher
Attorney

Feb. 22, 1966 S. KLEIN 3,236,429

TAPE HANDLING APPARATUS

Filed July 1, 1963 5 Sheets-Sheet 2

INVENTOR.
SEYMOUR KLEIN
BY Martin L. Kacher
Attorney

INVENTOR.
SEYMOUR KLEIN
BY Martin Kaplan[illegible]
ATTORNEY

TAPE HANDLING APPARATUS

Filed July 1, 1963 5 Sheets-Sheet 4

INVENTOR.
SEYMOUR KLEIN
BY Martin Lukacher
Attorney

TAPE HANDLING APPARATUS

Filed July 1, 1963 5 Sheets-Sheet 5

INVENTOR.
SEYMOUR KLEIN
BY Martin Lukacher
Attorney

United States Patent Office
3,236,429
Patented Feb. 22, 1966

3,236,429
TAPE HANDLING APPARATUS

Seymour Klein, South Philadelphia, Pa., assignor to Radio Corporation of America, a corporation of Delaware

Filed July 1, 1963, Ser. No. 291,839
6 Claims. (Cl. 226—42)

The present invention relates to object detection systems, and particularly to systems for detecting the deviation of an object which is movable along a path from a reference position.

The invention is especially suitable for use in tape handling apparatus, such as the tape transport of a magnetic tape station. Magnetic tape stations are component parts of electronic data processing systems. The invention, however, is generally applicable when it is desired to sense the position of an object.

Tape transports of magnetic tape stations generally include a pair of reels on which a tape record is wound, and between which the record is reeled. A tape drive system usually in the form of a capstan or capstans is provided for rapidly starting the tape from rest and accelerating the tape to high speed. Loops of tape are formed between the capstans and the reels for isolating the reels from the capstans. The capstans withdraw tape from or deposit tape into the loops, as they drive the tape. It is desirable to maintain loops of predetermined size between the capstan and each of the reels. To this end, a loop position detector is often used for providing an error signal which is used in a reel drive servo that controls the direction and speed of the reels so as to tend to maintain the loops in a desired position. Known loop position detectors have included photoelectric devices responsive to light, the transmission of which to the devices depends on the position of the loops. These detectors are often sensitive to variations in the intensity of the light from the light sources, as well as to variations in circuit characteristics. Accordingly, the error signals provided by these detectors may be a misleading indication of the position of the loop. Moreover, the detectors often do not directly indicate the deviation in the position of the loops from a desired position and require complex encoding circuitry for translating the photoelectric device's output signal into an error signal which may be used in the servo as a measure of the deviation in a loop from the desired position.

It is an object of the present invention to provide an improved tape loop position sensing or detecting system wherein the foregoing disadvantages are substantially overcome.

It is a further object of the present invention to provide an improved system generally useful for indicating the deviation of the position of an object from a reference position.

It is a still further object of the present invention to provide an improved tape loop sensor of the photoelectric type which is more accurate and less subject to variations in response to light intensity and to variations in circuit characteristics than those known in the art.

Briefly described, a system in accordance with the invention may include a plurality of sensing means for sensing the presence and absence of an object in their vicinities. The sensing means may be arranged in spaced relationship with each other along the path of movement of the object and may be arranged in first and second groups respectively on opposite sides of a reference position. The sensing means in the first and second groups respectively provide digital outputs of opposite significance in response to the presence of the object and also provide digital outputs of the opposite significance in response to the absence of an object. These digital outputs may be voltage levels of different value. Means are provided for converting the digital outputs into an analog signal which is a function of deviation of the object from a reference position. This signal is directly useful in a servo system for controlling the movement of the object, which servo system may be used to maintain the object at or restore the object to the reference position or a desired position in spite of deviations thereof from the reference position.

The invention itself, both as to its organization and method of operation, as well as additional objects and advantages thereof, will become more readily apparent from a reading of the following description in connection with the accompanying drawings, in which.

Figure 4:
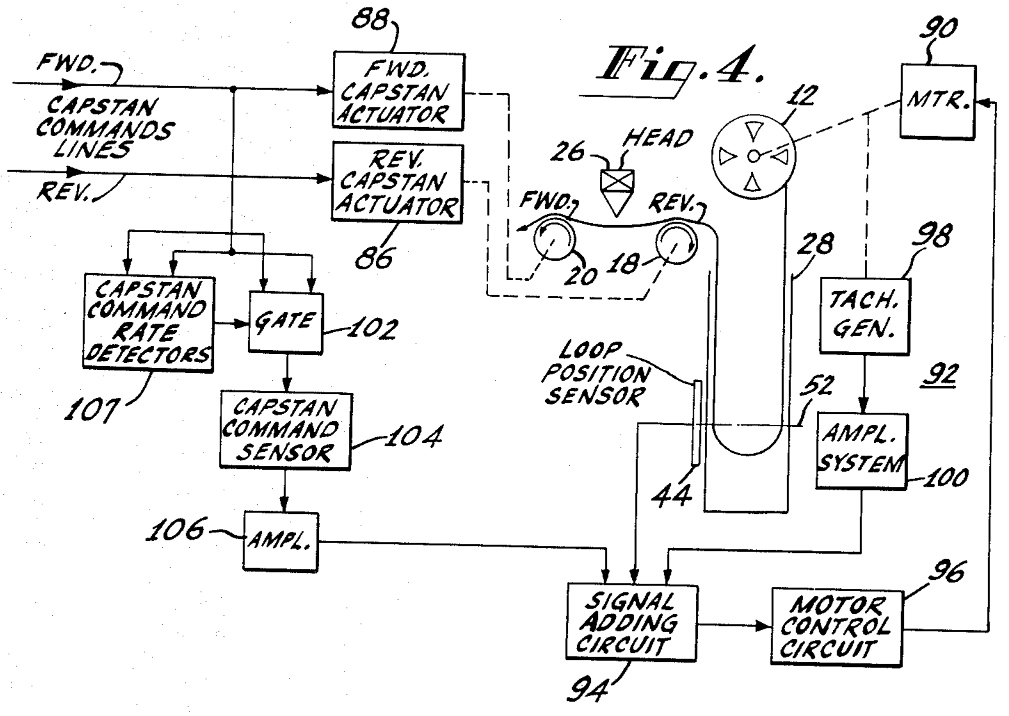
FIG. 4 is a diagram of a servo system for controlling tape motion in the tape transport shown in FIG. 1, the diagram being partially in diagrammatic and partially in block form.
Figure 5:
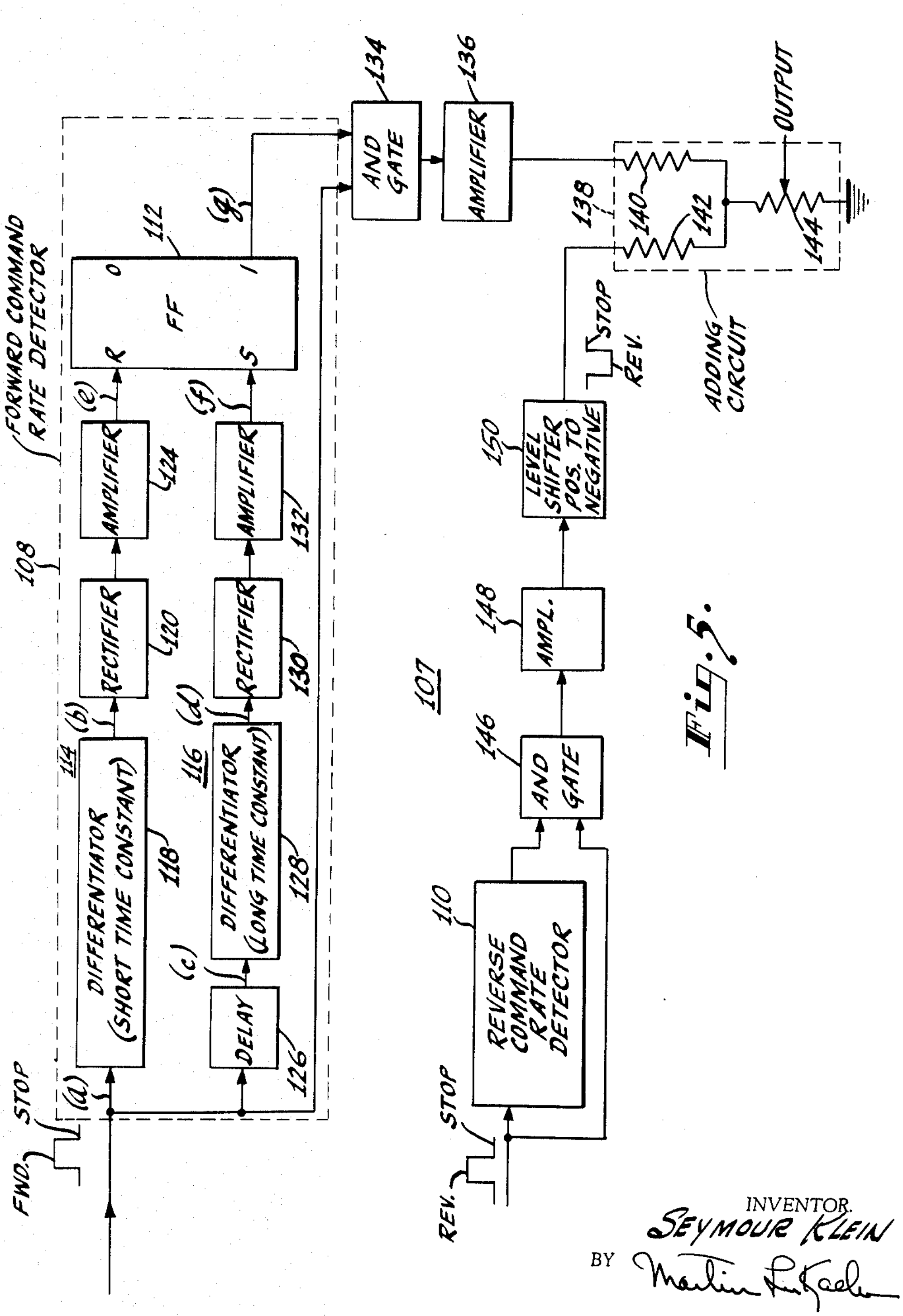
FIG. 5 is a block diagram showing, in greater detail, the capstan command rate detector of the system illustrated in FIG. 4.
Figure 6A:
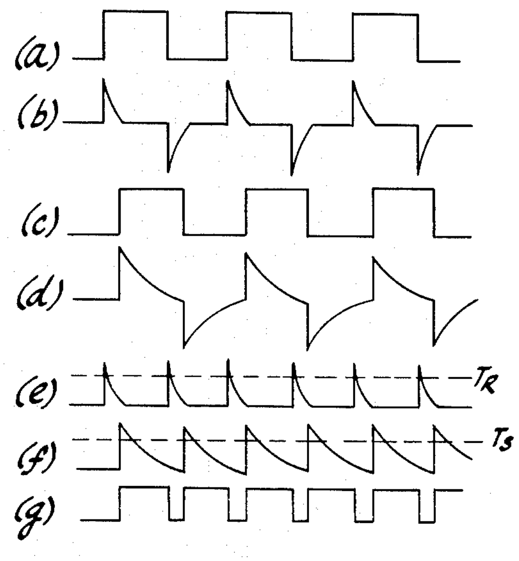
Figure 6B:
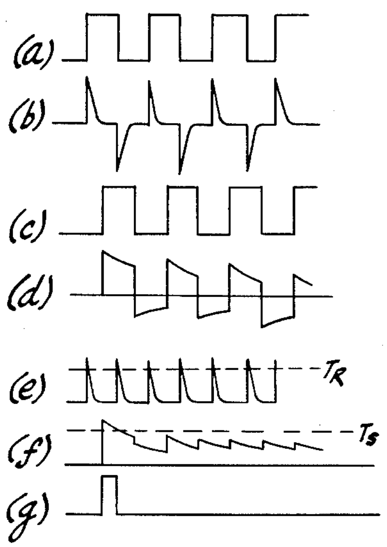
Figure 7:
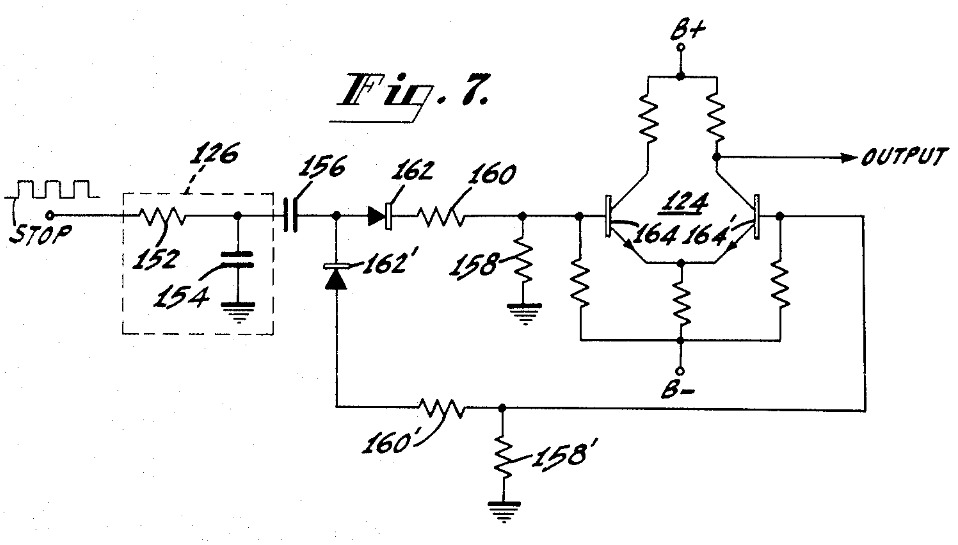
Figures 8, 9:
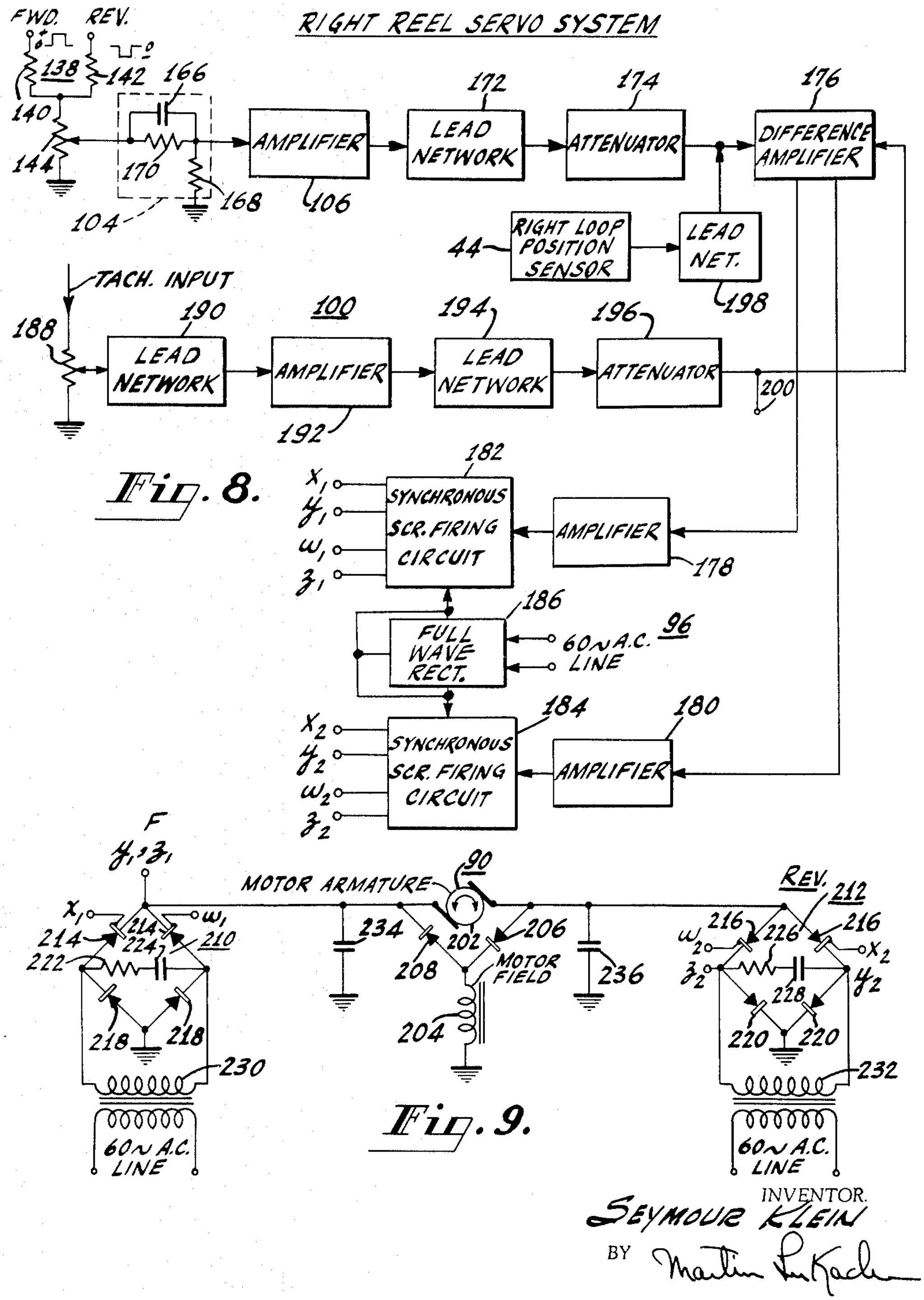

FIG. 6*a* and FIG. 6*b* are waveforms of signals which result in the operation of the detector shown in FIG. 5;

FIG. 7 is a schematic diagram of a portion of the circuit of the detector shown in FIG. 5;

FIG. 8 is a diagram, partially in block and partially in schematic form, showing, in greater detail, reel servo and motor control portions of the system illustrated in FIG. 4; and FIG. 9 is a schematic diagram of other portions of the motor control circuit illustrated in FIG. 4.

*Tape transport mechanism*

Figure 1:
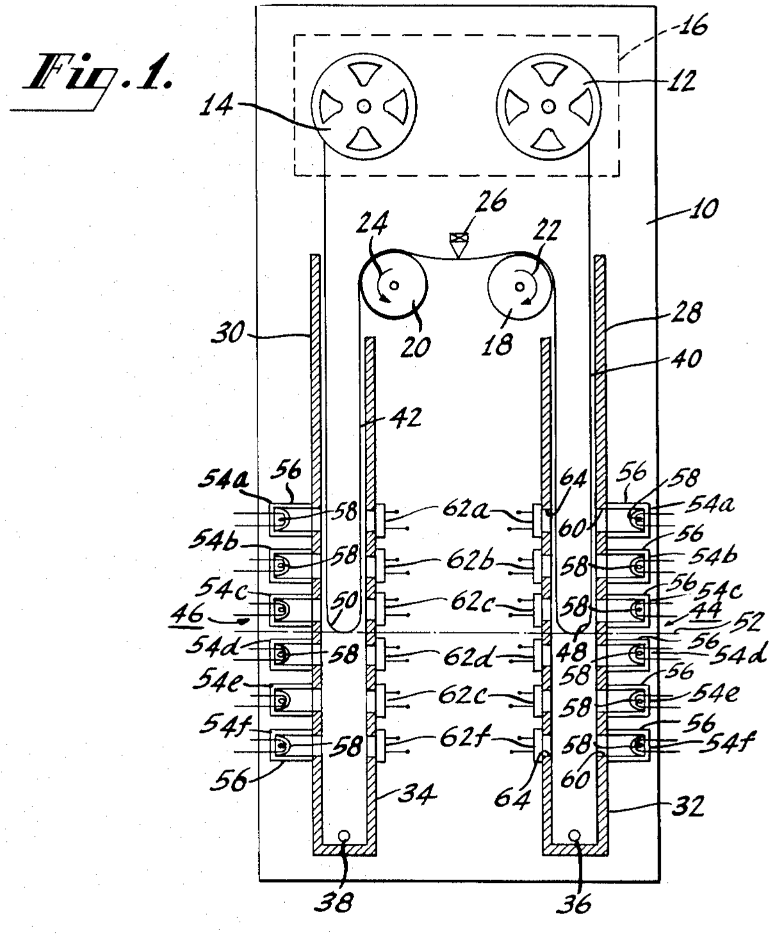
FIG. 1 is an elevational view diagrammatically depicting a tape station incorporating the invention.

Referring more particularly to FIG. 1, there is shown a panel 10. A pair of reels 12 and 14 are mounted on spindles which extend through the panel 10. The spindles and reels may be driven by separate electric motors (not shown) which are mounted behind the panel 10. The reels may be contained in a cartridge or magazine 16 indicated by the dashed line. A capstan assembly, including a pair of capstans 18 and 20, is also mounted on the panel 10. The capstans 18 and 20 may be vacuum capstans which are actuated to drive the tape when a vacuum source is communicated to their peripheral surfaces by electromagnetically actuable valves included in the capstan assembly. The capstan 18 rotates continuously in clockwise direction, as shown by the arrow 22, at a high peripheral speed( say, 150 inches per second). When the capstan control valve is actuated, the tape is drawn by vacuum into contact with the rotating peripheral surface of the capstan and the tape is rapidly accelerated from rest and driven in a direction from left to right. The capstan 20 rotates in a counter-clockwise direction, as indicated by the arrow 24. When the valve in the capstan 20 is actuated, the tape is accelerated rapidly in the reverse direction, or from right to left. The direction of tape travel from right to left is referred to herein as the forward direction, and the direction of tape travel from left to right is referred to herein as the reverse direction, for the sake of convenience. Accordingly, the capstan 18 is called the reverse capstan and the capstan 20 is called the forward capstan.

A magnetic head 26 is mounted on the panel 10 between the forward and reverse capstans. This magnetic head may be of the type known in the art capable of reading or writing a plurality of tracks on the tape. An electronic system is included in the tape station for driving the head to write bits of digital information transversely across the tape, each on a different one of the tracks, and also for reading or playing back the recorded information. This electronic system may be of the type known in the art, and therefore is not described in detail herein.

Facilities for forming and receiving tape loops are provided in the form of bins 28 and 30. These bins are constructed of U-shaped wall members 32 and 34, which are mounted in air-tight relationship on the panel 10 and covered by plates (not shown) which are spaced from the panel by a sufficient distance to provide clearance for the entry and exit of the tape. Ports 36 and 38 near the bottom of the bins may be connected to vacuum pumps which evacuate the bins. The tape is drawn by vacuum from the reels into the bins to form tape loops 40 and 42 in the bins 28 and 30, respectively.

*Loop position sensors*

The bins 28 and 30 are provided with sensors 44 and 46 for detecting deviations in the position of the bight portions 48 and 50 of the loops 40 and 42, respectively, with respect to a reference position indicated by a horizontal line 52. The detectors 44 and 46 therefore determine the size of the tape loops 40 and 42, respectively.

The detectors 44 and 46 are similar. The detector 44, by way of example, includes six light sources 54*a*, 54*b*, 54*c*, 54*d*, 54*e*, and 54*f*, which are cup-shaped receptacles 56, each containing an incandescent lamp 58. Apertures 60 on one side of the wall member 32 permit the passage of light from the lamps 58 into the bin. Lenses (not shown) may be included in each of the receptacles 56 for focusing the light along horizontal light paths across the bin 28. The light sources 54*a*, 54*b*, 54*c*, 54*d*, 54*e* and 54*f* may be spaced vertically at equal distance one from another. Three of the light sources 54*a*, 54*b*, and 54*c* above the reference line 52 form a first group. Three of the light sources 54*d*, 54*e*, and 54*f* below the reference line 52 form a second group.

Six light pick-up cells 62*a*, 62*b*, 62*c*, 62*d*, 62*e*, and 62*f* are provided corresponding, respectively, to the light sources 54*a*, 54*b*, 54*c*, 54*d*, 54*e*, and 54*f*. These cells may be of the type known in the art as "solar cells." Solar cell type 58C sold by Hoffman Electronics, El Monte, California, may be suitable. These cells 62*a*, 62*b*, 62*c*, 62*d*, 62*e*, and 62*f* are mounted in spaced relationship on the side of the wall member 32 opposite from the wall member side on which their corresponding light sources 54*a*, 54*b*, 54*c*, 54*d*, 54*e*, and 54*f* are mounted. Apertures 64, in the wall member side on which the cells 62*a*, 62*b*, 62*c*, 62*d*, 62*e*, and 62*f* are mounted, provide access for the passage of light between corresponding light sources and cells. The cells are also arranged in first and second groups, the first group including the cells 62*a*, 62*b*, and 62*c* on the upper side of the reference line 52, and the second group including the cells 62*d*, 62*e*, and 62*f* on the lower side of the reference line 52.

The light from different ones of the light sources 54*a*, 54*b*, 54*c*, 54*d*, 54*e*, and 54*f* is blocked from illuminating their corresponding cells 62*a*, 62*b*, 62*c*, 62*d*, 62*e*, and 62*f*, depending upon the position of the loop 40. Those cells above the bight 48 of the loop are not illuminated, and those cells below the bight 48 of the loop are illuminated. The sensor 46 has parts similar to the detectors 44 and these like parts are designated by like reference numerals.

Figure 2:
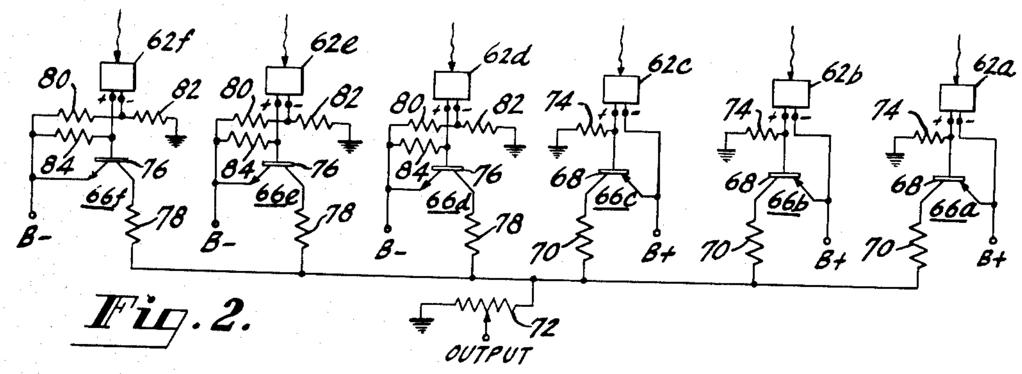
FIG. 2 is a schematic diagram of a circuit embodying the invention for sensing deviations in the position of a tape isolation loop from a predetermined position.

The circuitry associated with the solar cells 62*a*, 62*b*, 62*c*, 62*d*, 62*e*, and 62*f* for providing an output voltage which is a function of the deviation of the position of the bight 48 of the loop from the reference position 52 is shown in FIG. 2. The solar cells are two terminal devices which have the characteristic of providing a direct current voltage output across its terminals when illuminated, and presenting essentially an open circuit when not illuminated. Individual transistor circuits 66*a*, 66*b*, 66*c*, 66*d*, 66*e*, and 66*f*, are associated with individual solar cells 62*a*, 62*b*, 62*c*, 62*d*, 62*e*, and 62*f*, respectively. The circuits 66*a*, 66*b* and 66*c* associated with the first or upper group of solar cells 62*a*, 62*b*, and 62*c* are different from the circuits 66*d*, 66*e*, and 66*f* associated with the second or lower group of solar cells 62*d*, 62*e*, and 62*f*, as about to be explained.

The circuits 66*a*, 66*b*, and 66*c* are similar, each including a PNP transistor 68, which is emitter connected to a source of positive operating voltage indicated as B+ and collector connected through a load resistor 70 to an output resistor 72 which, in turn, is connected to ground. The output resistor may be a potentiometer having a movable tape at which the output voltage is derived. The base of each transistor 68 is connected to ground through a resistor 74. The solar cells 62*a* is connected between B+ and the base of one of the transistors 68 and polarized so that its output terminal, which becomes positive when the cell is illuminated, is connected to the base. The parts of the circuits 66*b* and 66*c*, which are like the parts of the circuit 66*a*, are identified with like reference numerals.

The circuits 66*d*, 66*e* and 66*f* are similar to each other and each includes an NPN transistor 76 which is emitter connected to a source of negative operating voltage, indicated as B—. The voltage provided by the source at B— is desirably identical in amplitude to the voltage provided at the source indicated at B+. Both sources desirably have good regulation and are returned to ground. Each transistor 76 has its collector connected through a load resistor 78 to the output resistor 72. Each circuit 66*d*, 66*e* and 66*f* has a biasing circuit including a pair of resistors 80 and 82 connected between B— and ground, and a base resistor 84 connected between B— and the base of the transistor 76. Each solar cell 62*d*, 62*e*, and 62*f* has one terminal connected to the base of its associated transistor 76 and the other terminal connected to the junction of its biasing circuit resistors 80 and 82. The solar cells are polarized so that those terminals which become positive when they are illuminated are connected to the bases of their respective transistors 76.

The upper group of solar cells 62*a*, 62*b*, and 62*c* and their associated circuits 66*a*, 66*b* and 66*c*, and the lower group of solar cells 62*d*, 62*e*, and 62*f* and their associated circuits 66*d*, 66*e*, and 66*f* constitute means which provide digital outputs of opposite significance in response to the presence of the tape loop. Each solar cell 62 and its associated circuit 66 individually operates as a photo-responsive switch, which is essentially insensitive to variations in the intensity of the light from the associated lamp 58 (FIG. 1), as well as to variations in circuit component characteristics. The first group of sensing means, including the cells 62*a*, 62*b*, and 62*c* and their associated circuits, has an opposite response to the presence of the tape loop from the response to the presence of the loop of the second or lower group of cells 62*d*, 62*e*, and 62*f*.

When a cell of the first group (for example, cell 62*a*) is not illuminated, that cell does not provide an output. The base of the corresponding transistor 68 is then at ground potential. The emitter is at positive potential. Accordingly, the transistor conducts and a positive output voltage appears at the junction of the load resistor 70 and the output resistor 72. Since the cell 62*a* is not illuminated when the loop blocks light from the light source 54*a* (see FIG. 1), the switch 62*a*–66*a* is actuated and provides a positive output voltage in response to the presence of the loop. On the other hand, when the loop is absent between the source 54*a* and the cell 62*a*, the cell 62*a* is illuminated and biases the base of the transistor 68 positively. The transistor is then cut off, the switch is inhibited and a zero voltage output appears across the load resistor 70. Since the source of positive operating voltage is connected to the negative terminal of the solar cell 62*a*, a positive voltage due to the source potential and the voltage due to the solar cell itself are accumulatively applied to the base of the transistor. The transistor therefore rapidly switches to its non-conductive state upon solar cell illumination. Thus, the degree of illumination of the cell is not critical and variations in circuit components also do not substantially effect the operation of the sensing unit.

The lower group of sensing units (for example, the units including the cell 62*d* and the transistor circuit 66*d*) responds oppositely to the presence and absence of illumination from the sensing units of the upper group. When the cell 62*d*, for example, is not illuminated, a negative voltage is applied through the base resistor 84 to the base of its associated NPN transistor 76. The transistor 76 is then cut off, the switch is inhibited and a zero output voltage appears across the output resistor 78. On the other hand, when the cell 62*d* is illuminated, it applies a positive voltage to the base of its transistor 76. The junction of the resistors 80 and 82 of the biasing circuit is effectively connected to the base of that transistor 76 as soon as the cell 62*d* is illuminated. The voltage across the resistor 82 is then applied to the base of the transistor 76. Since this voltage is much lower than the voltage applied to the emitter of the transistor 76 by the source at B−, the base becomes positive with respect to the emitter immediately upon illumination of the cell 62*d* and the switch is actuated. A small amount of illumination then switches the transistor 76 into conduction. The sensing unit is therefore relatively insensitive to variations in intensity of illuminaton, as well as to variations in circuit components. The cell 62*d* is illuminated in the absence of the tape loop and is not illuminated in the presence of the loop. A negative output voltage appears at the junction of its output resistor 78 and the load resistor 72 in response to the absence of the tape loop, whereas a zero output voltage appears when the presence of the tape loop is detected.

Accordingly, the sensing units of the upper group provide a zero output voltage and a positive output voltage, respectively, in response to the absence and presence of the tape loop, whereas the sensing units of the lower group provide a negative output voltage and a zero output voltage in response to the absence and presence of the tape loop, respectively.

Figure 3:
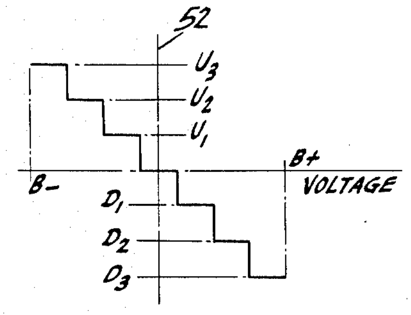
FIG. 3 is a curve of the response characteristics of the circuit shown in FIG. 2.

The output voltage which appears across the output resistor 72 varies, as shown in FIG. 3, in accordance with the deviation of the position of the tape loop. The abscissa of the curve corresponds to the output voltage. The ordinate of the curve is calibrated in accordance with the vertical position of the bight 48 of the loop. The ordinal axis also represents the position of the reference line 52.

The circuit shown in FIG. 2 operates essentially like a bridge circuit in providing the output characteristics shown in FIG. 3. The detector arm of the bridge is provided by the output resistor. Two adjacent arms of the bridge include the positive voltage source B+ and the negative voltage source B−, respectively. Adjacent arms of the bridge, which are opposite to the voltage sources, include the output resistors 70 and the output resistors 78, respectively. The resistors 70 in one arm are effectively in parallel with each other, and the resistors 78 in the adjacent arm are also effectively in parallel with each other. The resistors are individually connected or disconnected in the bridge, depending upon whether their associated transistors are conductive or non-conductive.

When the bight of the loop is at the reference line 52 position, the first group of cells 62*a*, 62*b*, and 62*c* is blocked, while the lower group of cells 62*d*, 62*e*, and 62*f* is unblocked. The upper group transistors 68, as well as the lower group transistors 76, are both conductive. The bridge then has equal numbers of resistors in the arms. Equal and opposite currents then flow through these resistor arms, resulting in zero current through the output resistor 72. The position of the bight of the loop at, or immediately adjacent, the reference line 52 is then indicated by a zero output voltage. As the bight of the loop moves upwardly, successive ones of the cells 62*c*, 62*b* and 62*a* are illuminated. The positions of the cells 62*c*, 62*b*, and 62*a* are respectively indicated as $U_1$, $U_2$, and $U_3$ in FIG. 3. The output voltage becomes more negative in steps as each of the levels $U_1$, $U_2$, and $U_3$ is progressively passed in the course of upward movement of the bight of the loop. Similarly, the output voltage across the resistor 72 becomes more positive as the positions of the lower group of cells 62*d*, 62*e*, and 62*f*, respectively indicated in FIG. 3 as $D_1$, $D_2$, and $D_3$, are progressively passed in the source of downward movement of the bight of the loop. The bridge-type circuit provided by the load resistors 70 and 78 and the output resistor 72 therefore converts the digital output of the sensing units, including the cells 62 and the transistors 66, into an analog output voltage. This output voltage may be used in a servo system for controlling the speed and direction of rotation of the reel motors 12 and 14 so as to tend to maintain the position of the bights of the loops 48 and 50 at the reference position indicated by the reference line 52. The sensor characteristic may be essentially linear as shown in FIG. 3 or may be made essentially non-linear by varying the voltage output at each step by varying the values of the load resistors 78 and 70.

*Control system in general*

The system provided for controlling the operation of the reels and capstans, and therefore for controlling the motion of the tape in the tape transport illustrated in FIG. 1, is shown in general in FIG. 4. The reverse and forward capstans 18 and 20 are, respectively, operated by reverse and forward capstan actuators 86 and 88. These actuators may be electromagnetic devices which operate the vacuum control valves in the capstans 18 and 20 when signals, in the form of voltage levels, are applied thereto along forward and reverse capstan command lines. These levels may be generated in the computer or other data processing equipment which governs the entry and removal of information from the tape station. Forward and reverse commands do not occur simultaneously; however, these commands may occur in rapid sequence. The tape stops at the termination of the commands. Brakes in the form of vacuum shoes (not shown) adjacent the head 26 may be provided for attracting and stopping the tape when the capstans are de-actuated.

In FIG. 4, the right reel 12, its associated bin 28, and the loop position sensor 44 are shown, but the left reel 14 and its associated apparatus are not shown in order to simplify the illustration. The right reel 12 is driven by a motor 90, which may be a series direct current motor. A servo system 92 is associated with the loop position sensor 44 and the motor 90 for driving the motor in the proper sense and speed to maintain the loop 40 which isolates the capstans from the reel 12 in predetermined position with the bight 48 of the loop along the reference line 52. A similar motor and servo system is associated with the left reel 14.

The servo system 92 includes a signal adding circuit 94, which may be an amplifier and resistor network of the type to be described in greater detail in connection with FIG. 8, and which combines the signal from the loop position sensor 44 with other signals and applies these signals to a motor control circuit 96. The motor control circuit 96 may be of the type described in detail hereinafter for controlling the direction and speed of rotation of the motor 90, so as to maintain the tape loop 40 in its predetermined position. A rate damping loop is included in the servo 92. This loop includes a tachometer generator 98 which is coupled to the shaft of the motor 90 and provides a signal that is proportional to the speed of the motor 90 and indicative of its direction. The output of the tachometer generator 98 is amplified in an amplification system 100, which applies the signal at proper amplitude and phase to the signal adding circuit 94.

The forward and reverse command levels are transmitted through an "and" gate 102 to a capstan command sensor 104, which is described in greater detail in connection with FIG. 8. The capstan command sensor responds to the onset and termination of the forward and reverse command levels and provides an output signal which is amplified in an amplifier 106 and applied in proper phase to the signal adding circuit 94 to instantaneously actuate the motor control circuit 96 and the motor 90 at the beginning of the command and also at the termination of the command. The reel is instantaneously driven at the beginning of a command so as to provide a sufficiently large loop of tape in the bin 28 to facilitate the withdrawal or deposit of large amounts of tape from or into the bin, as may occur when the capstans 18 or 20 are initially commanded to start and accelerate the tape. The reels are also driven at the termination of a command in a direction to prevent the reels from excessively coasting and thereby depositing into or removing from the bin excessive amounts of tape. The tape position therefore remains in a relatively limited range about the predetermined position at the reference line 52. Accordingly, the longitudinal distance, vertically along the bin 28, which need be covered by the loop position sensor 44 is reduced and the size of the loop position sensor, accordingly, may be relatively small.

When a forward command level is applied to the forward capstan actuator, the tape is suddenly started from rest and accelerated in a forward direction. The tape is then withdrawn from the bin 28. The rate of acceleration of the tape is limited to some extent by the size of the loop 40 in the bin 28. Although the mass of tape in the loop is relatively small, the force tending to oppose the acceleration of the tape, due to this small mass, is relatively large because of the high rate at which the tape tends to be accelerated by the capstan. Accordingly, it is desirable to reduce the size of the tape loop. The size of the tape loop quiescently stored in the bin 28 may be reduced because the reel servo system is made to respond instantaneously to the capstan command. When a reverse command occurs, a signal is generated by the capstan command sensor, which signal has a sense opposite to the sense of the capstan command signal which is generated in response to a forward command. The reel servo 92 is then actuated to drive the reel in a direction to instantaneously take up tape from the bin 28. Thus, tape is withdrawn from the bin before excessive tape can accumulate therein. Such tape accumulations are undesirable since the tape may fold over on itself and thereby become wrinkled or otherwise damaged.

In normal tape station operation, the tape may be stopped, started, and reversed as many as two hundred times per second. Thus, the command signal levels may occur at a relatively rapid rate. In such cases, the average position of the tape tends to remain approximately constant and large amounts of tape do not tend to be withdrawn from or deposited into the bin. Capstan command rate detectors 107 are provided which respond to the rate of the capstan command signals and either inhibit or enable the gate to transmit to the capstan command sensor 104 the forward and reverse command signal levels, respectively, when the command signal rate is higher or lower than a predetermined rate. Separate capstan command rate detectors 108 and 110, respectively (described in greater detail in connection with FIG. 5), respond to the forward command signals and to the reverse command signals.

The same system of capstan command rate detectors and capstan command sensors may supply signals to the left reel servo system as well as to the right reel servo system 92. Since the tape path provided in the tape transport, as shown in FIG. 1, provides for tape reeling in opposite directions for the same sense of rotation of the reels 12 and 14, signals of like polarity from the capstan command sensor 104 cause the proper sense of reel rotation in response to forward and reverse commands. Duplication of parts is therefore reduced in the system provided by the invention.

*Capstan command rate detectors*

The capstan command rate detectors, as shown in FIG. 5, include a forward command rate detector 108 and a reverse command rate detector 110. The forward and reverse detectors 108 and 110 are similar. Only the forward detector 108 is shown in detail by way of example. This detector includes a flip-flop circuit 112 of the type known in the art, having reset and set inputs and "0" and "1" outputs. Only the "1" output is used and is a positive voltage level when the flip-flop is set and a zero voltage level when the flip-flop is reset. Two transmission channels 114 and 116 are respectively connected to the reset and set inputs of the flip-flop 112. The channel 114, connected to the reset input, includes a differentiator circuit 118 which has a relatively short time constant, for example, approximately $0.4 \times 10^{-3}$ second. The differentiator 118 differentiates the forward command signal and applies the differentiated signal to a full-wave rectifier 120 which converts the output of the differentiator circuit into pulses of like, positive polarity. These pulses are amplified in an amplifier 124 and applied to the reset input of the flip-flop 112. The other channel 116 includes a delay circuit 126, which may be a resistance-capacitance network which applies the command signals, after a short delay, to a differentiator circuit 128, having a relatively long time constant as compared to the time constant of the differentiator circuit 118, for example, approximately $88 \times 10^{-3}$ second. The pulses formed by the differentiator 128 are rectified in a rectifier 130, similar to the rectifier 120, amplified in an amplifier 132, and applied to the set terminal of the flip-flop 112. When the flip-flop 112 is set, an "and" gate 134 is enabled to transmit the forward command signals to an amplifier 136, which may be of the emitter-follower type. The output of the amplifier 136 is applied to an adding circuit 138 including three resistors 140, 142, and 144, the latter one of which is an output resistor.

The operation of the rate detector will be apparent from the waveforms in FIGS. 6*a* and 6*b*. Waveform (*a*) illustrates the forward signals which, in FIG. 6*a*, occur slower than at a given rate, and in FIG. 6*b*, occur faster than at a given rate. Waveform (*b*) illustrates the differentiated pulses which are produced by the differentiator circuit 118. The delayed forward command signals are illustrated in waveform (*c*). The long time constant differentiator may include a capacitor and a resistor. The capacitor has sufficient time to discharge between forward command signals when the forward command signals occur at a relatively slow rate, as shown in FIG. 6*a*. However, the capacitor does not have sufficient time to fully discharge when the forward command signals occur at a rapid rate, as shown in waveform (*d*) of FIG. 6*b*. The output of the differentiator 128 tends to drift toward the zero axis. Thus, when the command signals occur at a rapid rate, the amplitude of the differentiated forward command signals at the output of the long time constant differentiator 128, with respect to the zero axis, becomes less than the amplitude of the differentiated forward command signals at the output of the short time constant differentiator 118.

Waveform (*e*) illustrates the rectified and amplified output pulses of the channel 114, which includes the short time constant differentiator 118. The amplitude of these pulses is always above the reset threshold level $T_R$ of the flip-flop 112. Thus, the flip-flop 112 will be reset by any of these pulses. Waveform (*f*) of FIG. 6*a* illustrates the output of the channel 116 for forward command pulses which occur at a relatively slow rate. These pulses have an amplitude approximately equal to the amplitude of the pulses in the channel 114, which amplitude is above the set threshold $T_S$ of the flip-flop 112. Thus, the flip-flop 112 will be reset by any of the slow rate pulses passing through the upper channel 114. Because the pulses from the channel 116 which set the flip-flop 112 occur immediately after the pulses from the channel 114 which reset the flip-flop 112 (the flip-flop 112 is in a set condition immediately after the onset of the forward command pulses and the "and" gate 134 is enabled to transmit the forward command pulses after a very slight delay. This delay is insufficient to affect the proper operation of the capstan command sensor 104 (FIG. 4) in instantaneously activating the reel servo upon occurrence of a forward command.

On the other hand, rectified and amplified output pulses from the channel 116 having the long time constant differentiator 128, as shown in waveform (*f*) of FIG. 6*b*, are below the set threshold $T_S$ of the flip-flop 112 except for the initial one of these pulses. Accordingly, the flip-flop 112 will remain in its reset state for the duration of a series of rapidly repetitive forward command signals. The "and" gate 134 is then inhibited and the forward command signals are not transmitted to the capstan command sensor (FIG. 4) by way of the adding circuit 138.

The reverse command rate detector operates similarly to the forward command rate detector and inhibits an "and" gate 146 when the rate of the reverse commands is above the given rate. When the "and" gate 146 is enabled, the gate transmits the reverse command signals through an amplifier 148, which may be of the emitter-follower type, to a level shifter circuit 150, which shifts the level of the reverse command signals from a positive to a negative level. This level shifter 150 may be a direct current amplifier, the output of which is clamped to zero volts except upon occurrence of a reverse command signal, at which time the level shifter 150 provides a level of equal amplitude and duration to the reverse command level, but of opposite, or negative, polarity. The output of the adding circuit 138 is therefore a positive level and a negative level, respectively corresponding to forward and reverse commands.

Circuitry suitable for providing either the channel 114 or the channel 116 of the command rate detectors is shown in FIG. 7. The delay circuit 126 includes a series resistor 152 and a shunt capacitor 154. This delay circuit is omitted in the channel 114 and used only in the channel 116. After the delay, if present, the command signals are applied to a differentiator circuit which includes a capacitor 156 and one or another of two shunt resistors 158 and 158'. Other resistors 160 and 160' may be connected in series with the capacitor 156 for attenuation purposes, if desired. Diodes 162 and 162', which are oppositely polarized with respect to ground, are connected to the resistors 160 and 160', respectively. The diode 162 makes the differentiator circuit including the capacitor 156 and resistor 158 effective for differentiating the positive-going leading edge of the command signals, while the diode 162' makes the circuit including the capacitor 156 and the resistor 158' is effective for differentiating the negative-going leading edge of the command signals. The amplifier 124 and the diodes 162 and 162' cooperate in both full-wave rectifying and amplifying the differentiated pulses. The amplifier 124 is a difference or differential amplifier, including NPN transistors 164 and 164'. The output of the amplifier is obtained at the collector of the transistor 164'. The difference amplifier operates to invert the phase of the negative pulse outputs of the differentiator, including the resistor 158', so that the output at the collector of the transistor 164' is a series of positive-going pulses, as shown, for example, in waveform (*e*) of FIG. 6*a*.

*Reel servo system in detail*

The capstan command sensor 104 is shown in greater detail in FIG. 8. A differentiator circuit including a series capacitor 166 and a shunt resistor 168 receives the input signals. The capacitor is connected between the tap on the potentiometer 144 of the adding circuit 138 (see also FIG. 5) and the input to the amplifier 106. The capacitor 166 is shunted by a resistor 170. The capstan command sensor 104 senses the onset and termination of the command signal levels by differentiating the signal levels, thereby providing pulses having a polarity corresponding to the type of command signal and the onset or termination of the command signal. A positive pulse indicates the onset of a forward command signal level and a succeeding negative pulse indicates the termination of that forward command signal level. A negative pulse indicates the onset of a reverse command signal level and a succeeding positive pulse indicates the termination of that reverse command signal level. The differentiator circuit of the capstan command sensor 104 desirably has a time constant which is much shorter than the period of the capstan commands. The time constant may, for example, be 0.043 second provided by a capacitance of one microfarad due to the capacitor 166 and a resistance of 43 kilo-ohms due to the resistor 168. The resistors 168 and 170 constitute a voltage divider for feeding a portion of the command signal level without differentiation as an error signal into the servo system for reasons which will be explained more fully hereinafter.

The output of the amplifier 106 is transmitted through a lead network 172, which may be a resistance-capacitance, high-pass filter network of the type known in the art for advancing the phase of the error signal to compensate for phase delay occurring in certain other elements of the servo.

An attenuator 174, which may be in the form of a voltage divider, controls the level of the signals which are applied to a difference amplifier 176 having two inputs and two outputs. One form of the difference amplifier may, by way of example, be a symmetrical circuit including a pair of transistors having a common emitter-resistor. Accordingly, signals applied to the base of one of the transistors will be translated into a pair of corresponding signals respectively of opposite polarity at the collectors of these transistors. The voltages between the collectors and ground may constitute the outputs of the difference amplifier. These outputs are applied to the motor control circuit 96 which is shown in part in FIG. 8 as including a pair of buffer amplifiers 178 and 180, which amplifiers respectively control different synchronous, silicon-controlled rectifier (SCR) firing circuits 182 and 184. The outputs of these circuits, indicated as $x_1$, $y_1$, $w_1$, and $z_1$, and $x_2$, $y_2$, $w_2$, and $z_2$, are utilized in the circuit of FIG. 9 for controlling the direction and speed of rotation of the motor 90 (FIG. 4) which drives the right reel 12 (FIG. 1). This motor circuit of FIG. 9 will be described in detail hereinafter.

The synchronous SCR firing circuits 182 and 184 are synchronized by the output of a full-wave rectified A.C. line voltage obtained from a full-wave rectifier, such as a diode bridge. The synchronous SCR firing circuits 182 and 184 may be designed in accordance with the techniques described in the Silicon Controlled Rectifier Manual (Second Edition), published by General Electric Rectifier Components Department, West Genesee Street, Auburn, New York (see Section 4.13.7). The circuits 182 and 184 each include a uni-junction transistor having a capacitor connected to its emitter electrode. The capacitor is charged at a rate which is a function of the amplitude of the output signal from the amplifier 178 or 180 connected thereto. This control of charging current may be obtained by connecting the capacitor in series with the emitter-collector path of a transistor and controlling the current through the transistor in accordance with the amplifier output voltage. The circuit is synchronized with the A.C. line voltage by discharging the transistor once during each half-cycle of the line voltage through a transistor switch triggered by the full-wave rectified signal obtained from the full-wave rectifier 186. When the voltage across the capacitor exceeds the firing potential of the unijunction transistor, that transistor fires and provides triggering signals to fire the SCR's in the motor control circuit, as will be explained more fully hereinafter in connection with FIG. 9.

The input to the opposite side of the difference amplifier 176 (sometimes called a differential amplifier) is from the amplifier system 100 of the rate damping loop of the reel servo (see FIG. 4). The input signal to this amplifier system is derived from the tachometer across a potentiometer 188. The tachometer input is transmitted to a lead network 190, which may be a high-pass filter of the type known in the art, and is amplified in an amplifier 192 which may be a one-stage transistor amplifier. The output of the amplifier 192 is transmitted through another lead network 194, which may provide a greater phase advance than the lead network 190. The lead networks 190 and 194 may be similar to the differentiating circuit of the capstan command sensor 104 and the lead network 172, respectively. Since the rate damping loop is connected to the opposite side of the difference amplifier 176, it tends to oppose, and therefore damp, tape motion in response to error signals produced, for example, by the capstan command sensor. The lead networks 190 and 194 in the amplifier system 100 of the rate damping loop cause rate damping signals to be generated in proper phase relationship with the error signals produced by the capstan command sensor. The rate damping loop, therefore, damps the reel motions produced by these error signals and prevents hunting in the servo. The amplifier system 100 also includes an attenuator 196, which may be in the form of a voltage divider for providing proper signal level inputs to the difference amplifier 176. One of the attenuators 174 and 196 may include a variable resistor for balancing the difference amplifier 176.

The right position loop sensor, which may be the detector circuit 44 described in connection with FIGS. 1 to 3, is connected through a lead network 198 (FIG. 8) to the same input of the difference amplifier 176 as the capstan command sensor output signal. The servo system which is used for the left reel is similar to the servo system for the right reel. However, the left loop position sensor output signal is applied to an input terminal 200 which is connected to the opposite or rate loop input side of the difference amplifier 176 because loop position sensor output signals of like polarity should cause the reels 12 and 14 to rotate in opposite directions. The difference amplifier 176 provides the function of and operates as the signal adding circuit 194 (FIG. 4) since it combines the output signals from the capstan command sensor, the loop position sensor, and the rate damping loop, and utilizes the combined signals to operate the motor control circuit 96, including the amplifiers 178, 180 and the firing circuits 182 and 184.

The operation of the reel servo system will be apparent from the following example wherein it is assumed that the forward command signal is not inhibited by the capstan command rate detectors 107 and is applied to the adding circuit 138 (FIG. 5) and to the capstan command sensor 104. The capstan command sensor 104 (FIG. 4 or 8) differentiates the signal and provides a positive voltage pulse corresponding to its leading edge. This pulse is applied, (FIG. 8) after amplification, phase shift, and attenuation in the amplifier 106, lead network 172 and attenuator 174, respectively, to one input of the difference amplifier 176, where the pulse is translated into two output pulses, respectively of equal amplitude and opposite polarity, and applied to the inputs of the amplifiers 178 and 180. These amplifiers 178 and 180 are biased to transmit signals of only one polarity, say positive. Accordingly, only the amplifier 178, which controls the firing circuit 182, operates to amplify the pulse corresponding to the leading edge of the forward capstan command signal. The amplified pulse causes the firing circuit 182 to fire the SCR's early in the cycle of the power voltage. A large current is then transmitted through the motor, which may be a series direct current motor. The motor consequently develops a high torque in a clockwise direction, as shown in FIG. 1. The tape is instantaneously driven into the bin 28. The capstan 20, in the meantime, has started the tape from rest in the forward direction and has withdrawn tape from the bin 28. The instantaneous operation of the reel in response to the command signal, however, supplies tape to the bin 28 before the initial tape loop is exhausted, even though the tape loop is relatively short.

After the initial pulse developed by the capstan command sensor 104 (FIG. 8) disappears, a positive voltage level is continually applied to the input of the difference amplifier 176 in response to the forward command signal because of the action of the voltage divider including the resistor 168 and 170 in the capstan command sensor 104. This positive signal operates the amplifier 178 and causes the SCR firing circuit 182 to fire the SCR's for a part of the cycle of the power line voltage. This part of the power line voltage cycle, or "duty" cycle, is less than the duty cycle over which the SCR's are fired in response to the onset of the capstan command signal. However, the average current through the reel motor is of such an amplitude as to maintain the position of the loop of the tape 40 (FIG. 1) in the bin 28 substantially constant. In other words, as the tape is withdrawn from the bin 28 by the forward capstan 20, it is supplied to the bin 28 from the reel 12. The position sensor 44 (FIG. 8) responds to deviations in the position of the loop. Since the capstan command sensor 104 provides an error signal of sufficient magnitude to cause the reel 12 (FIG. 1) to supply tape to the loop, the position sensor 44 (FIG. 8) need not be relied upon for this function.

The position sensor 44 need respond only to a shorter range of deviations in the position of the bight 48 (FIG. 1) of the loop from the reference line 52. Accordingly, the position sensor 44 may be made smaller and may be less expensive by reason of the use of the capstan command sensor 104 (FIGS. 4 and 8) to provide the error signal during normal run, as well as start operation of the tape transport. The position sensor 44 (FIG. 1) may be used to provide the error signal which conditions the reel 12 to supply the tape during normal run operation instead of the capstan command sensor, if desired. The position sensor 44 also operates to provide the last-mentioned error signal when the capstan command rate detectors inhibit the flow of the capstan command signals to the capstan command sensor 104 (FIGS. 4 and 8). In the case when the command signals to the sensor 104 are inhibited, the position of the bight 48 of the tape loop 40 does not change materially. Accordingly, a relatively short position sensor is sufficient to provide the requisite error signal.

At the termination of the forward command signal, a negative pulse is developed by the capstan command sensor 104, (FIG. 8). This negative pulse operates the other amplifier 180, which fires the other firing circuit 184. The motor is then driven instantaneously in the reverse direction, so as to rapidly brake and stop the tape motion. It will be apparent that the system operates in response to reverse commands to drive the reel 12 in a direction to take up the tape while the capstan 18 starts the tape from rest and accelerates the tape in a reverse direction. The tape is taken up by the reel 12 before an excessive amount of tape can accumulate in the bin 28, even though the bin 28 may be relatively short.

*Motor control circuit*

The motor 90, shown in FIG. 9, is a direct current motor of the series type having an armature winding 202 and a field winding 204. A pair of current steering diodes 206 and 208 are connected in series with each other and polarized in the same direction when viewed in series. The series connected diodes are connected across the armature winding 202, the ends of which may be considered first and second motor terminals. The field winding 204 is connected between ground, which may be considered a third motor terminal, and the junction of these diodes 206 and 208. Two bridge rectifier circuits 210 and 212 for respectively providing output voltages which are positive and negative with respect to ground are provided. The motor 90 rotates in a clockwise sense so as to feed the tape in a forward direction when the rectifier 210 is conditioned for operation; and the motor 90 rotates in a counter-clockwise sense so as to drive the tape in a reverse direction when the other rectifier 212 is operated. The rectifiers 210 and 212 are similar, full-wave rectifier circuits and have adjacent arms including SCR's 214 in the rectifier 210 and SCR's 216 in the rectifier 212. Diodes 218 are included in the other adjacent arms of the rectifier 210 and other diodes 220 are included in corresponding adjacent arms of the rectifier 212. A transient damping circuit, including a resistor 222 and a capacitor 224, is connected across the input terminals of the rectifier 210, and a similar transient damping circuit, including a resistor 226 and a capacitor 228, is connected across the input terminals of the other rectifier 212. Power from the 60-cycle alternating current line is applied across the input terminals of the rectifiers 210 and 212 by way of transformers 230 and 232, respectively.

The forward rectifier 210, which provides a positive voltage output, is connected to that same side of the armature winding 202 as is the cathode of one of the steering diodes 208. The reverse rectifier 212, which provides a negative voltage output, is connected to the other terminal of the armature winding 202. The anode of the other steering diode 206 is also connected to that terminal. Accordingly, when the forward rectifier 210 is operating, current flows in one direction (from left to right, as viewed in FIG. 9) through the armature winding 202, through the steering diode 206, and in one direction through the field winding 204 to ground. On the other hand, when the reverse rectifier 212 is operating, current flows in the opposite direction through the motor field winding 204, then through the diode 208, the motor armature winding 202, and back to the reverse rectifier 212. The direction of current flow through the armature winding 202 remains the same regardless of which rectifier 210 or 212 is operating. However, the direction of current through the field winding 204 is reversed. The motor therefore turns in the forward direction (clockwise) when the forward rectifier 210 is operated, and in the reverse direction (counterclockwise) when the rectifier 212 is operated. The positions of the field and armature windings may be interchanged.

Filter capacitors 234 and 236 are connected between ground and the terminals of the armature winding 202. These capacitors filter the full-wave rectified A.C. outputs of the rectifiers and smooth the current supplied to the motor by the rectifiers 210 and 212. Heating losses in the motor are therefore reduced. The impedance of the load imposed by the motor and the capacitor at power line frequency is essentially a capacitive load, rather than an inductive load, as would be presented by the motor alone. The capacitive load causes more rapid response in the servo system than would an inductive load, and it assures consistent turn-off of the SCR's.

The output terminals $x_1$, $y_1$, $w_1$, and $z_1$ of the synchronous SCR firing circuit 182 in FIG. 8 are connected to the gate terminals of the SCR's 214 in FIG. 9. These gate terminals are indicated in FIG. 9 as $x_1$, $y_1$, $w_1$, and $z_1$. Correspondingly indicated terminals $x_1$, $y_1$, $w_1$, and $z_1$ of the firing circuit 182 (FIG. 8) and of the SCR's are interconnected. Similarly, the output terminals $x_2$, $y_2$, $w_2$, and $z_2$ of the firing circuit 184 are connected to the gate terminals of the SCR's in the reverse rectifier 212. Accordingly, when the firing circuit 182 is triggered, the SCR's 214 fire and a positive voltage output is generated by the forward rectifier 210. When the firing circuit 184 is triggered, the SCR's 216 are fired and a negative output voltage is provided by the reverse rectifier 212. The firing of the SCR's is synchronized by the line voltage, as explained above. Accordingly, the duty cycle of the rectifiers varies in accordance with the error signal from the servo system which is applied to the amplifiers 178 and 180 by way of the difference amplifier 176. The average current through the motor and the speed of the motor therefore depends upon the amplitude of the error signal. The direction of rotation of the motor depends upon which of the rectifiers 210 or 212 is operated, which, in turn, depends upon the polarity of the error signal. Accordingly, the direction and speed of the reel motor depends upon the amplitude and polarity of the error signal.

From the foregoing description, it will be apparent that there has been provided improved tape handling apparatus especially suitable for use in the servo system of a magnetic tape station. Variations in the herein described apparatus, within the spirit of the invention, will, undoubtedly, become apparent to those skilled in the art. Accordingly, the foregoing description should be taken merely as illustrative and not in a limiting sense.

What is claimed is:

1. Apparatus for indicating the deviation of the bight of a loop of tape which is movable longitudinally in accordance with variations in the size of said loop, said apparatus comprising (a) a plurality of photosensitive devices arranged in a column adjacent one side of said loop;

(b) a light source means disposed in a column adjacent the opposite side of said loop, each of said plurality of photosensitive devices being responsive to light from said light source means;

(c) a plurality of switching circuits, each corresponding to a different one of said plurality of photosensitive devices and each for providing an output when actuated;

(d) means for connecting a first group of said plurality of devices disposed on one side of a reference position and a second group of said plurality of devices disposed on the opposite side of said reference position, respectively, to their corresponding said switching circuits, said first group devices and said second group devices respectively actuating and inhibiting their corresponding switching circuits when illuminated, said first group devices and said second group devices respectively inhibiting and actuating their corresponding switching circuits when not illuminated;

(e) an output resistance; and (f) a plurality of resistances connected between the said switches and said output resistance for summing the output voltages from said plurality of switches across said output resistance whereby to derive a final output signal which varies in amplitude and polarity in accordance with the amount and sense of deviations of the bight of said loop from said reference position, which final output signal is indicative of variations in the size of said loop.

2. In a tape transport having a reel and a tape drive capstan and wherein the tape is formed into a loop between said reel and said capstan, which loop varies in size, a system for indicating the deviations in size of said loop from a given size, said system comprising (a) a plurality of solar cells arranged longitudinally in a column along one side of said loop;

(b) a plurality of light sources, each corresponding to a different one of said plurality of solar cells, each of said plurality of light sources being disposed facing its corresponding solar cell along the opposite side of said loop of tape whereby said loop of tape blocks illumination of certain of said plurality of solar cells by their corresponding light sources depending upon the size of said loop of tape and the position of the bight thereof, a first group of said plurality of solar cells being disposed on one side of a reference position and a second group of said plurality of solar cells being disposed on the opposite side of the reference position;

(c) a plurality of transistor circuits, each corresponding to a different one of said plurality of solar cells;

(d) means for applying operating and biasing voltages to the transistors in those of said plurality of circuits corresponding to said first group of solar cells for providing output voltages of one value and polarity when actuated;

(e) means for applying operating and biasing voltages to the transistors in those of said circuits corresponding to said second group of solar cells for providing output voltages of said one value and of opposite polarity when actuated;

(f) means connecting said plurality of solar cells and their corresponding transistor circuits to each other for inhibiting the transistors of said first group circuits and actuating the transistors of said second group of circuits when their corresponding solar cells are illuminated and for actuating said first group transistors and inhibiting said second group transistors when their corresponding solar cells are not illuminated;

(g) an output resistor; and (h) a plurality of resistors connected between the said transistors and said output resistor for summing the output voltages from said plurality of transistors across said output resistor whereby to derive a final output signal which varies in amplitude and polarity in accordance with the amount and sense of deviations of the bight of said loop from said reference position, which final output signal is indicative of variations in the size of said loop.

3. In a tape transport having a reel and tape drive capstan and wherein the tape is formed into a loop between said reel and said capstan, which loop varies in size, a system for indicating deviations of the bight of said loop from a reference position, said system comprising (a) a plurality of photosensitive means disposed in spatial relationship with each other adjacent said loop of tape, said plurality of photosensitive means being arranged in first and second groups respectively on opposite sides of said reference position;

(b) light source means for activating and deactivating said photosensitive means in accordance with the deviations of said tape loop bight from said reference position;

(c) a plurality of resistance means, each corresponding to a different one of said plurality of photosensitive means;

(d) means including said first and second groups of said plurality of photosensitive means for coupling their respective resistance means in parallel combinations;

(e) means for providing first and second operating voltages and a fixed potential at first, second, and third circuit points, respectively, the value of said fixed potential being intermediate the values of said first and second potentials;

(f) a summing node and an output resistance means;

(g) means for connecting said output resistance means between said summing node and said third circuit point; and (h) means including said parallel combinations for coupling said first and second circuit points to said summing node, the output voltage across said output resistance means responding to said tape loop bight deviations in step like increments, of which the average magnitude and polarity relative to said fixed potential are indicative of the amount and direction, respectively, that said tape loop bight deviates from said reference position.

4. The invention as claimed in claim 3 wherein at least some of said step like increments are unequal in value.

5. In a tape transport having a reel and a tape drive capstan and wherein the tape is formed into a loop between said reel and said capstan, which loop varies in size, a system for indicating deviations of the bight of said loop from a reference position, said system comprising (a) a plurality of photosensitive means disposed in spatial relationship with each other adjacent said loop of tape, said plurality of photosensitive means being arranged in first and second groups respectively on opposite sides of said reference position;

(b) light source means for activating and deactivating said photosensitive means in accordance with the deviations of said tape loop bight from said reference position;

(c) a plurality of resistances, each corresponding to a different one of said plurality of photosensitive means;

(d) means for providing first and second operating voltages and a fixed potential at first, second, and third circuit points, respectively, the value of said fixed potential being intermediate the values of said first and second potentials;

(e) a summing node and an output resistance;

(f) means for connecting said output resistance between said summing node and said third circuit point;

(g) first means including each of said first group of said plurality of photosensitive means for coupling their respective resistances in parallel with one another between said first circuit point and said summing node; and (h) second means including each of said second group of said plurality of photosensitive means for coupling their respective resistances in parallel with one another between said second circuit point and said summing node, the output voltage across said output resistance responding to said tape loop bight deviations in step like increments, of which the average magnitude and polarity relative to said fixed potential are indicative of the amount and direction that said tape loop bight deviates from said reference position.

6. The invention as claimed in claim 5 wherein at least some of said step like increments are unequal in value.

References Cited by the Examiner

UNITED STATES PATENTS

| | | | |
|---|---|---|---|
| 2,422,651 | 6/1947 | Ayers | 226—118 X |
| 2,907,565 | 10/1959 | Sauter | 226—42 |
| 2,952,415 | 9/1960 | Gilson. | |
| 3,135,447 | 6/1964 | Raymond | 226—118 X |

M. HENSON WOOD, Jr., *Primary Examiner.*

RAPHAEL M. LUPO, *Examiner.*